US009716788B2

(12) United States Patent
Bendi et al.

(10) Patent No.: US 9,716,788 B2
(45) Date of Patent: Jul. 25, 2017

(54) MULTIPLE SECONDARY DEVICE CALL CONTROLS AND PROTOCOLS

(71) Applicant: Verizon Patent and Licensing Inc., Arlington, VA (US)

(72) Inventors: Sethumadhav Bendi, Walnut Creek, CA (US); Amir Mayblum, Walnut Creek, CA (US); Jerry Kupsh, Concord, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 439 days.

(21) Appl. No.: 14/540,517

(22) Filed: Nov. 13, 2014

(65) Prior Publication Data

US 2016/0142536 A1    May 19, 2016

(51) Int. Cl.

| | |
|---|---|
| H04M 1/56 | (2006.01) |
| H04M 15/06 | (2006.01) |
| H04M 3/42 | (2006.01) |
| H04M 3/428 | (2006.01) |
| H04W 12/06 | (2009.01) |
| H04W 4/16 | (2009.01) |
| H04L 29/06 | (2006.01) |
| H04W 12/08 | (2009.01) |

(Continued)

(52) U.S. Cl.
CPC ...... H04M 3/4288 (2013.01); H04L 65/1006 (2013.01); H04L 65/1096 (2013.01); H04W 4/16 (2013.01); H04W 12/06 (2013.01); H04W 12/08 (2013.01); H04L 61/157 (2013.01); H04L 63/101 (2013.01); H04M 3/42263 (2013.01); H04M 2203/2072 (2013.01); H04W 8/26 (2013.01)

(58) Field of Classification Search
USPC .... 379/142.05, 145.08, 188, 211.01, 211.02, 379/211.04, 215.01; 455/422.1, 426.1, 455/461, 462
See application file for complete search history.

(56) References Cited

U.S. PATENT DOCUMENTS 6,574,325 B1 *  6/2003  Baiyor ............... H04M 3/22
                                                    379/211.01
7,162,020 B1 *  1/2007  Forte ............... H04M 3/42263
                                                    379/201.01

(Continued)

*Primary Examiner* — Quoc D Tran

(57) ABSTRACT

To control secondary devices of a subscriber whose primary device is subscribed to a mobile network, a secondary mobile directory number ("MDN") and secondary device identifiers are employed. After the primary device is rung, an Authentication and Call Waiting Engine receives a request from a Telephony Gateway to retrieve identifiers of any secondary devices that are linked to a primary MDN of the primary device. Next, the Authentication and Call Waiting Engine retrieves a secondary device identifier for each secondary device that is paired with the primary device by searching a secondary device identifier database with the primary MDN to find all linked secondary device identifiers. A rules database may be applied to exclude secondary device identifiers based on time of day and day of the week. The Authentication and Call Waiting Engine transmits the list of qualified secondary device identifiers to the Telephony Gateway for ringing.

20 Claims, 7 Drawing Sheets

(51) Int. Cl.
  *H04W 8/26* (2009.01)
  *H04L 29/12* (2006.01)

(56) References Cited

U.S. PATENT DOCUMENTS

| | | | |
|---|---|---|---|
| 7,327,981 B2* | 2/2008 | Hundal | H04M 1/6033 455/41.2 |
| 7,657,270 B2* | 2/2010 | Hicks, III | H04M 3/42263 379/211.04 |
| 8,135,124 B2* | 3/2012 | Ramanathan | H04M 3/42042 379/211.01 |
| 8,379,814 B2* | 2/2013 | Frey | H04M 3/42263 379/114.21 |
| 8,385,232 B1* | 2/2013 | Chen | H04M 3/465 370/259 |
| 9,277,049 B1* | 3/2016 | Danis | H04M 3/42042 |
| 2006/0128376 A1* | 6/2006 | Alexis | H04M 1/725 455/426.1 |
| 2007/0154005 A1* | 7/2007 | Daigle | H04M 1/274575 379/211.04 |
| 2009/0239528 A1* | 9/2009 | Ryley | H04W 4/12 455/426.1 |

* cited by examiner

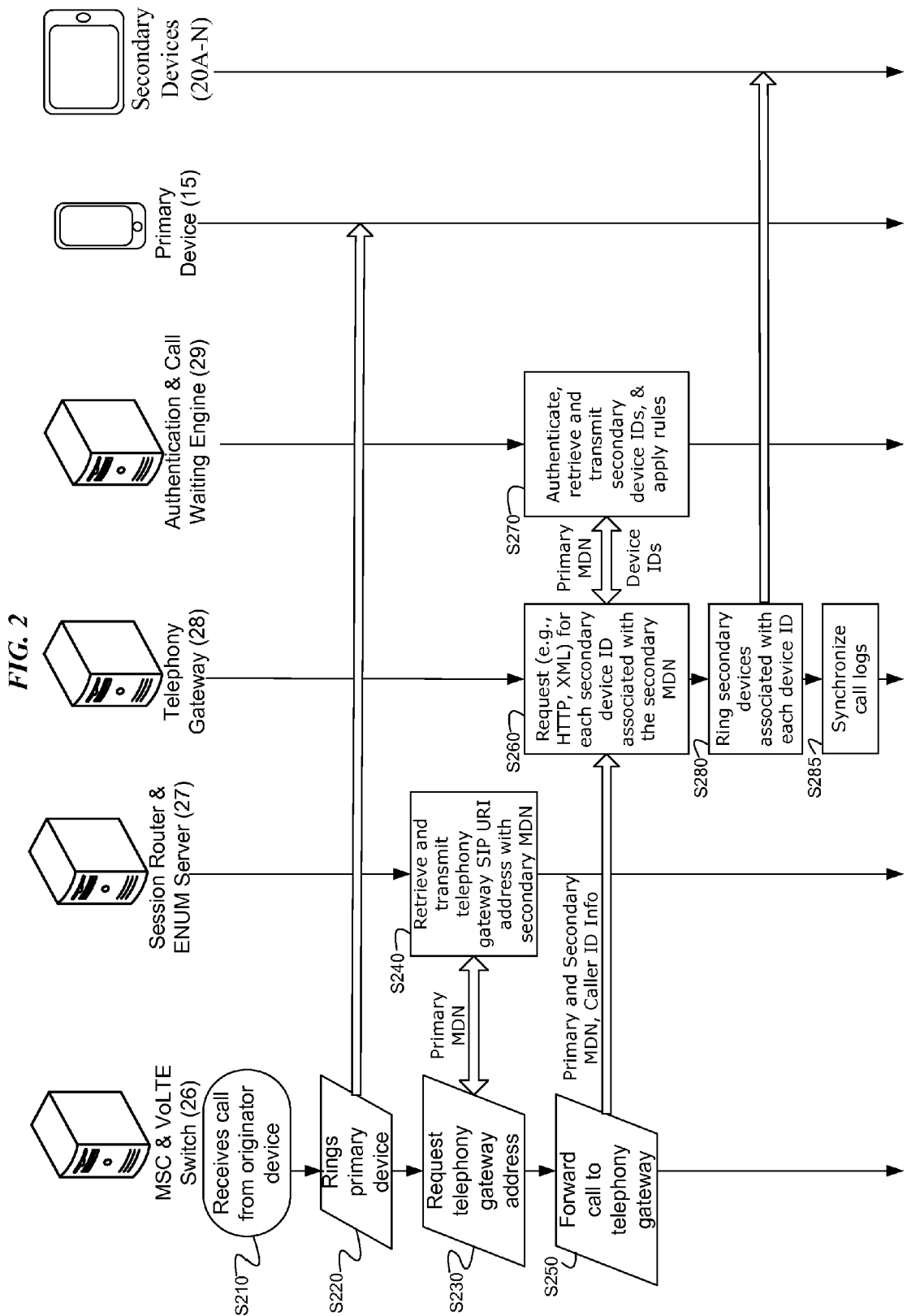

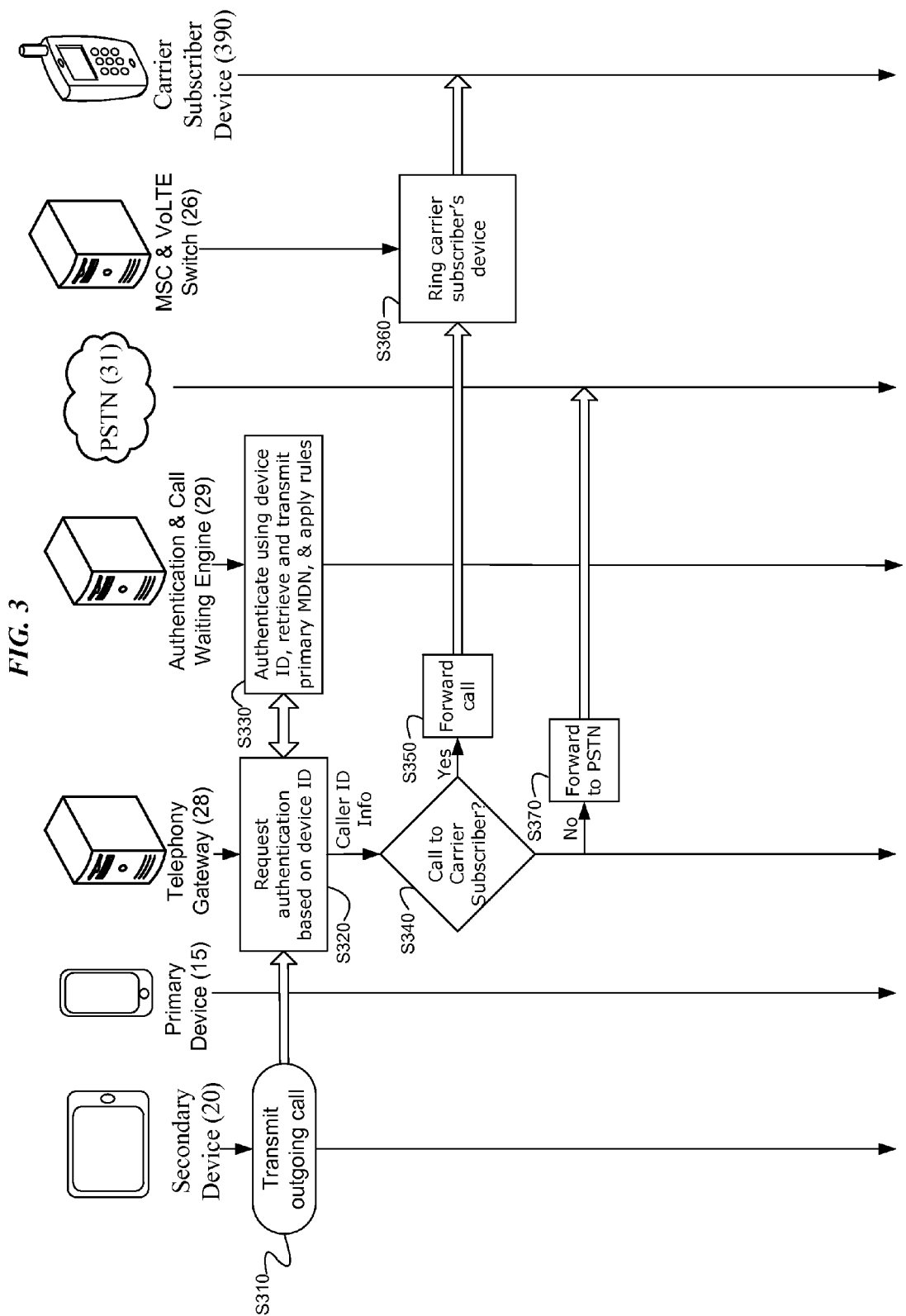

| Primary MDN | Secondary MDN |
|---|---|
| 201-123-4567 | 100-123-4567 |
| 202-123-4567 | 100-234-5678 |
| 213-123-4567 | 100-345-6789 |
| 310-123-4567 | 100-456-7891 |
| ... | |

| Primary MDN | Secondary Device ID 1 | Secondary Device ID 2 | Secondary Device ID 3 | Secondary Device ID 4 | Secondary Device ID 5 |
|---|---|---|---|---|---|
| 201-123-4567 | 1234567890123441 | 1234567890123442 | 1234567890123443 | 1234567890123444 | 1234567890123445 |
| 202-123-4567 | 2234567890123441 | 2234567890123441 | 2234567890123441 | 2234567890123441 | |
| 213-123-4567 | 3234567890123441 | 3234567890123441 | 3234567890123441 | | |
| 310-123-4567 | | | | | |
| ... | | | | | |

| Secondary Device ID | Rule 1 | Rule 2 |
|---|---|---|
| 12345678901234 1 | Ring: 5pm-8pm, Mon-Fri | Ring: Sat and Sun |
| 12345678901234 2 | Ring: 9am-5pm, Mon-Fri | |
| 12345678901234 3 | Do Not Ring: 9am-5pm, Mon-Fri | |
| 12345678901234 4 | ... | |

480 ↗

490 ↗

MULTIPLE SECONDARY DEVICE CALL CONTROLS AND PROTOCOLS

BACKGROUND

Generally described, call forwarding is a feature of some telephony switching systems that redirects, or diverts, calls to a different destination than the intended recipient's phone number. The forwarded destination is typically a phone number where the recipient is available. Unfortunately, call forwarding technology has many shortcomings.

Non-telephony devices, such as laptops, tablets, etc., which are not physically configured to receive a subscriber identity module ("SIM") card and lack a wired telephony connection, are unable to receive forwarded calls using the current technology. Although non-telephony devices are typically connected to a non-telephony network, such as WiFi, these non-telephony devices cannot receive or initiate calls through a mobile carrier network that relies on SIM cards for authentication. Moreover, non-telephony devices cannot call out to a telephony device that is connected to a public switched telephone network ("PSTN"). It should be understood that a "non-telephony device" is a computing device, such as a laptop, tablet, or other portable computing device that is not physically configured to receive a SIM card to receive or initiate calls through a mobile carrier network, and is not connected to a PSTN.

Another problem with existing call forwarding technology is that service at the intended recipient's device or phone number is disrupted because simultaneous ringing of both the intended recipient's phone number and the forwarded destination phone number is unsupported. The previous solutions also fail to enable multiple device alerting and selective rule-based routing to multiple devices based on a subscriber's preferences. Consequently, there are many drawbacks to existing call forwarding technology.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a flow chart of a procedure for simultaneous ringing of multiple secondary devices for incoming calls.

FIG. 3 is a flow chart of a procedure for placing outgoing calls from a secondary device.

FIGS. 4A-B are examples of database structures employed to link secondary devices with a primary device.

FIG. 4C is an example of database structure to provide rule-based routing to secondary devices based on a carrier network subscriber's preferences.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
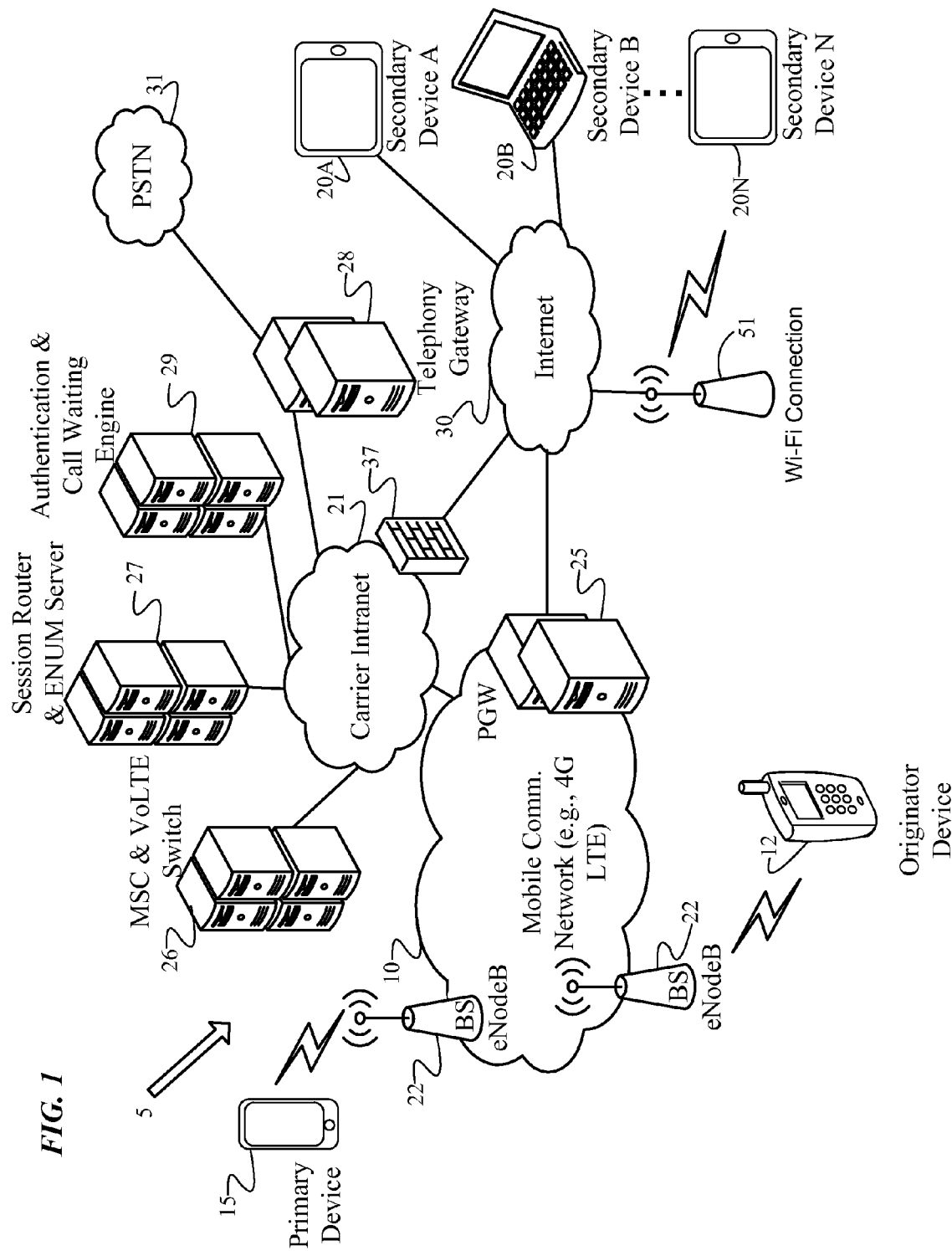
FIG. 1 is a high-level functional block diagram of an example of a system of networks and devices that provide a variety of communication services, including communications in support of multiple device ringing of secondary devices.

Reference now is made in detail to the examples illustrated in the accompanying drawings and discussed below. FIG. 1 illustrates a functional block diagram of a system 5 that supports communications to devices that do not have a subscription to a mobile network.

The illustrated system 5 includes a mobile communication network 10, in this case, operated in accordance with fourth generation (4G) Long Term Evolution (LTE) standards, although other wireless networks at least supporting data and voice communications may be used. The 4G LTE mobile network 10 in the example provides mobile telephone communications as well as Internet data communication services. For example, mobile network 10 may connect to public packet-switched data communication networks such as the Internet 30 via a packet gateway (PGW) server 25. Data communications via mobile network 10 with network connected equipment, provided for a user of primary device 15, may support a variety of services such as communications of text and multimedia messages, e-mail, web browsing, streaming or downloading content, etc.

In our discussion, the originator device 12 and primary device 15 use packet communications via a mobile network 10, Intranet 21, and the Internet 30, which typically would utilize packet transport and Internet Protocol ("IP"), including for voice calls and related communications. The originator device 12 and primary device 15, here, however, can utilize other networks, other forms of network transport, and/or other protocols for the relevant communications. For example, Voice communication may involve transport via the Internet 30 using voice over Internet Protocol ("VoIP") technologies; although additional networking equipment (not shown) may be provided for separate voice transport, e.g. if the network 10 utilizes wireless communication technologies offering traditional circuit switched transport for voice telephone type services.

As shown, system 5 includes an originator device 12, primary device 15, and one or more secondary devices 20A-N (representative of any number of secondary devices). The system 5 provides subscribers of a carrier network 10 the flexibility to ring multiple secondary devices 20A-N that do not possess a subscription to the mobile communications network 10. The terms "ring" or "ringing" mean to send or sending a call alert to cause a device to vibrate or produce an audible sound in order to signal or indicate a call. Originator device 12 is typically a regular mobile telephony device with a subscription to carrier provided services of network 10. However, originator device 12 can be a more conventional landline telephony device that is connected to the public switched telephone network ("PSTN") 31. Primary device 15 is a regular mobile telephony device with a subscription to carrier provided services, including voice call services of the mobile communications network 10.

Secondary devices 20A-N have an IP network connection and are affiliated with the primary device 15, but do not have a subscription to network 10. In the example, a carrier is an entity that operates a network, such as mobile network 10, and the mobile network carrier is the entity that operates network 10 to provide services to devices 12, 15, 20A-N of users/subscribers. The system 5 supports calls to and from secondary devices 20A-N that are linked with a primary mobile device 15 that has wireless service on the mobile network 10.

Originator device 12, primary device 15, and secondary devices 20A-N can be laptops, personal digital assistants ("PDAs"), smartphones, tablet computers, portable games or media players with wireless communication elements, or other portable devices designed to communicate via one or more wireless networks, including packet-switched or circuit-switched transport networks.

Primary device 15 wirelessly connects to mobile network 10 through a cellular base station (BS) 22 to communicate, two of which appear in the drawing by way of example. The primary device 15 in the example corresponds to a smartphone and includes a universal integrated circuit card ("UICC") with SIM credentials, such as a traditional SIM card, code division multiple access ("CDMA") subscriber identity module (collectively, "CSIM"), universal subscriber identity module ("USIM"), or IP Multimedia Services Identity Module ("ISIM"). The SIM memory securely stores credentials, such as the international mobile subscriber identity ("IMSI") and the related key to identify and authenticate subscribers on the telephony device. The IMSI is a 64-bit field, for example, that includes a mobile country code ("MCC"), mobile network code ("MNC"), and mobile subscriber identification number ("MSIN"). The SIM card also has a unique serial number or integrated circuit card identifier ("ICCID"), the IMSI, security authentication and ciphering information, a list of services the subscriber has access to, passwords, and temporary information pertaining to the network. When in a GSM network environment, the card includes a SIM application. For use in a UMTS network environment, the SIM card may also include a USIM application.

In the illustration, secondary devices 20A-N correspond to a tablet, a laptop computer, and tablet, respectively. Before secondary devices 20A-N register with the Telephony Gateway 28 and Authentication & Call Waiting Engine 29 to become affiliated with primary device 15, secondary devices 20A-N are unable to communicate via mobile network 10. This is because secondary devices 20-A-N lack the requisite SIM credentials for communication on the carrier network 10. In other words, secondary devices 20A-N may have the physical capability to communicate, but are not activated for communication via the mobile wireless communication network 10. Secondary devices 20A-N, however, are in communication with Internet 30 and have the capability to communicate via other wired or wireless media, such as a WiFi connection 51 or even short range communication methodologies, including Bluetooth or near field communication ("NFC").

Primary device 15 and secondary devices 20A-N have network communication capability and one or more physical elements for providing a user interface. Internally, such devices typically include one or more wireless transceivers for data communication, a processor configured/connected to control device operation, a memory and programming. As discussed more later, these devices also include one or more physical elements for biometric input, and are programmed or otherwise configured to perform various functions involved in the multiple device call controls.

The carrier that operates the network 10 will also utilize a variety of other systems for related purposes, such as network maintenance, accounting, and provisioning. In the example, the carrier has another data network, e.g. Intranet 21, that provides data communications for other data systems used by the carrier; and that Intranet 21 has connectivity into the network 10 that provides the actual communications services to the carrier's customers/subscribers. Examples of carrier systems that reside in or communicate via the Intranet 21 include systems for maintaining account records and for processing of network usage data for billing purposes. The Intranet 21 is connected to the Internet 30 via routing and protective gear generally represented by the firewall 37.

For purposes of the present discussion, equipment communicating via the carrier Intranet network 21 includes a Mobile Switching Center and/or Voice over Long-Term Evolution Switch ("MSC & VoLTE Switch") 26. For example, in a VoLTE environment like that shown, MSC & VoLTE Switch 26 can be a Telephony Application Server, often referred to as a "TAS." The MSC & VoLTE Switch 26 controls bearer traffic flow through the network switching subsystem that carries out call switching to allow mobile devices, such as primary device 15, to communicate with other mobile devices, such as originator device 12, as well as telephones in a public switched telephone network ("PSTN") 31. The MSC & VoLTE Switch 26 can be a soft switch that allows handsets, such as originator device 12 or primary device 15, to cross networks for incoming and outgoing voice calls. In other words, MSC & VoLTE Switch 26 enables device crossover regardless of the type of control signals used on the particular network.

There may be one or more computer platforms to perform the functions of the MSC & VoLTE Switch 26, which can provide redundancy and enable handling of a particular expected peak volume of switching transactions. In an alternative implementation in a conventional CDMA environment (not shown), a Mobile Switching Center (MSC) is a switching system in the mobile network (CDMA implementation analogous to 10 in the drawing) responsible for handling voice calls as well as other services (such as messaging, conference calls, and data services) as a service delivery node and sets up and releases the end-to-end connection, handles mobility and hand-over requirements during each call and takes care of reporting call statistics for charging. For purposes of the present discussion, the MSC in a CDMA network can provide multiple alerting and functions in support of the multiple device control call control service similar to those attributed herein to the MSC & VoLTE Switch 26.

Session Router & Number to Uniform Resource Identifier ("URI") Mapping Server 27 (collectively "Session Router ENUM Server") is also in communication via the carrier Intranet network 21 and acts as a type of bridge between the switched telephony network 10 and the Internet 30. The Session Router & ENUM Server 27 translates telephone numbers into Internet addresses by, for example, looking up a dialed telephone number in the ENUM tree of the domain name server ("DNS"). Based on the lookup, the Session Router & ENUM Server 27 determines whether there are alternate ways to just call out to a telephone line or number. When a Session Initiated Protocol ("SIP") address or SIP URI is retrieved or generated from the lookup of a primary device's mobile directory number ("MDN"), for example, the call may be routed through the Internet 30 or Intranet 21, depending on the retrieved MDN. Typically, the SIP URI resembles an e-mail address and is written in the following format:

SIP URI=sip:x @ y:Port where x=Username and y=host (domain or IP address)

Accordingly, Session Router & ENUM Server 27 generally translates telephone numbers or MDNs, such as a primary MDN assigned to mobile primary device 15, by effectuating a lookup function to determine a URI or IP address that can be used in Internet 30 or Intranet 21 communication call routing. As explained below, the Session Router & ENUM Server 27 resolves the primary device's MDN, typically the phone number, into a secondary MDN to facilitate multiple secondary device ringing. From this, the SIP URI can be generated or a SIP URI that includes the secondary MDN and Telephony Gateway domain/IP address already embedded within may be retrieved directly from a secondary MDN database table. The secondary MDN can be non-routable ten digit number, for example, in the sub-200 range, meaning the number corresponding to the three upper digits is below 200, so that secondary MDN is not actually assigned to a subscriber in the United States. Secondary MDN is generated by the Authentication & Call Waiting Engine 29 when the subscriber associated with the primary device 15 enrolls in the multiple device call transfer service and is then linked to the primary MDN in a secondary MDN database table. Alternatively, secondary MDN can be generated the first time that a subscriber designates a secondary device to receive incoming calls or place outgoing calls. Accordingly, the MSC & VoLTE Switch 26 knows to route this virtual secondary type of MDN for secondary device ringing during an incoming call to the Telephony Gateway 28. In other words, the secondary MDN is used to route the incoming call to Telephony Gateway 28.

To reduce the number of lookups in the database and requests to Session Router & ENUM Server 27, a single and common secondary MDN that is linked to all of the plurality of secondary devices 20A-N is used. For example, the single and common secondary MDN is a virtual MDN that is generated in the manner discussed above and is the same number/identifier for each of the plurality of secondary devices 20A-N. Alternatively, each secondary device 20A-N can be associated with a separate and distinct secondary MDN. To support the control of multiple secondary devices 20A-N, the SIP URI that is retrieved for the primary MDN has the secondary MDN embedded or encoded as the username and the domain/IP address of the Telephony Gateway Server 28 embedded or encoded as the host.

Telephony Gateway Server 28 is also in communication via the carrier Intranet network 21 and builds a bridge to connect voice over IP ("VoIP") phone systems with legacy telephone systems, such as PSTN 31. The Telephony Gateway Server 28 can be used, for example, to convert between VoIP protocols and traditional integrated services for digital network ("ISDN") protocols used in circuit-switched telephone networks, e.g., serving analog telephone lines. In addition, Telephony Gateway Server 28 can even convert VoIP calls from one code to another, to bridge multiple VoIP technologies together. To provide these services, Telephony Gateway Server 28 is typically a software switch that includes interfaces to both IP networks and the PSTN 31.

In order to achieve ringing of multiple secondary devices 20A-N, Telephony Gateway Server 28 sends a request, such as via Hypertext Transfer Protocol ("HTTP") or Extensible Markup Language ("XML"), to the Authentication & Call Waiting Engine 29. The request asks the Authentication & Call Waiting Engine to determine whether the subscriber of the primary device 15 is, in fact, enrolled for the simultaneous ringing service. If the subscriber is registered for the service, the Telephony Gateway Server 28 can receive each secondary device ID that is mapped to each of the secondary devices 20A-N via a response, such as via HTTP or XML from Authentication & Call Waiting Engine 29.

Authentication & Call Waiting Engine 29 determines whether secondary devices 20-A-N should be authenticated or recognized as being affiliated with primary device 15. The Authentication & Call Waiting Engine 29 creates the unique secondary device identifiers when the secondary devices 20A-N are registered. Each secondary device 20A-N is registered with the Authentication & Call Waiting Engine 29 and mapped with a unique secondary device identifier. Consequently, Authentication & Call Waiting Engine 29 has access to a secondary device identifier database that associates or links secondary devices 20A-N to the primary device 15 and has unique identifiers for each secondary device.

In one example, Authentication & Call Waiting Engine 29 receives primary and secondary MDNs and the caller identification ("ID") information from Telephony Gateway Server 28 with the request, for example. Accordingly, the Authentication & Call Waiting Engine 29 retrieves the secondary device identifiers for devices that are paired with the primary device 15 by cross-referencing the primary MDN to find/identify all associated secondary device identifiers in the secondary device ID database. When paired, the primary device 15 and secondary devices 20A-N recognize each other and are connected in order to talk to each other. Pairing can take place over a variety of wireless or wired connections and communication methodologies, such as Bluetooth, WiFi, near-field communication, audio, etc. The primary MDN is typically used as the key for this search; however, the secondary device ID database can be structured such that the secondary MDN serves as the key for retrieval of the secondary device identifiers.

Before retrieving the secondary device identifiers associated with the primary MDN, the Authentication & Call Waiting Engine 29 typically checks the primary MDN against a subscriber identity database to ensure that the subscriber associated with the primary device 15 is in good standing on his/her account, for example, to determine that the subscriber is up to date on their bill. When the subscriber is not in good standing, the subscriber may be sent a message (e.g., a text message) indicating that the subscriber is not in good standing on the primary device 15. The message indicates that the subscriber has been denied access to the bridging/ringing services to secondary devices 20A-N until the subscriber's bill is paid, thus ending the procedure.

Next, the Authentication & Call Waiting Engine 29 determines whether the subscriber associated with the primary MDN is registered for the bridging/ringing service to secondary devices 20A-N, such as by consulting the subscriber database. If the subscriber of the primary device 15 associated with the primary MDN is registered for multiple secondary ringing, the Authentication & Call Waiting Engine 29 confirms to the Telephony Gateway 28 that the subscriber associated with the primary device 15 is, in fact, linked to secondary devices 20A-N and transmits the secondary device IDs linked to the registered secondary devices 20A-N back to Telephony Gateway 28. When the subscriber is not registered for secondary device ringing, the subscriber is sent a message (e.g., a text message) on the primary device 15. The message indicates to the subscriber that the secondary device bridging/ringing services are available.

In our example, before transmitting the secondary device IDs back to Telephony Gateway 28, Authentication & Call Waiting Engine 29 uses a separate rules database to limit calls to secondary devices 20A-N to particular days, such as days of the week, or times during a day. The rules may also limit calls to secondary devices 20A-N based on the location of the secondary devices 20A-N, such as by determining the proximity of the secondary devices 20A-N to primary device 15 via short-range communications or a positioning system. Thus, the rules may impose secondary device ringing limitations based on the relative location of secondary devices 20A-N to the primary device 15. When the secondary device is within the short-range communication range of the primary device 15, the ringing service may be disabled or enabled, depending on the subscriber's preferences or system default rule settings.

In another example, the rules may set limits on the secondary devices 20A-N based on the absolute location as determined via GPS or another positioning technique. When the secondary device is within a specified location, the ringing service may be disabled or enabled, depending on the subscriber's preferences or system default rule settings. The rules are established via a rules module (see FIG. 5) of Authentication & Call Waiting Engine 29 based on default settings or adjusted by the subscriber on the primary device 15 or secondary devices 20A-N using an application, such as a web browser or native application. For example, if a call is made during school or work hours to primary device 15, a rule might specify to not ring the secondary devices 20A-N during those hours. Similarly, if a call is received over the weekend, the rules database may specify to only ring the associated subscriber's secondary devices 20A-N that reside at home instead of the office.

The rules database may also specify a maximum number of secondary devices 20A-N that can be registered for simultaneous ringing of incoming calls or to make going outgoing calls, such as ten devices. Such rules may be established via a rules module (see FIG. 5) of Authentication & Call Waiting Engine 29 based on default settings. Alternatively, limitations on the maximum number of secondary devices 20A-N may be adjusted by the subscriber on the primary device 15 or secondary devices 20A-N using an application. These rules settings may be linked to the primary MDN of the primary device 15 in the rules database. Based on the rules database, only qualified device IDs are selectively sent back to Telephony Gateway 28 for ringing; the unqualified secondary device IDs are excluded. A secondary device ID is qualified when the rules imposed on the corresponding secondary device are not violated, for example, the limits imposed on usage of the particular secondary device on particular days and times of day are satisfied, thereby allowing outgoing or incoming call communications to take place with the secondary device. In other words, rules database is used to check whether there is a violation of the usage rules imposed on taking an incoming call or placing an outgoing call via the secondary devices.

The carrier devices and servers 25-29 employed by the carrier as outlined above may be merged with each other or divided into further devices and servers despite their logical and physical organization in the illustration. For example, the collective functionality of Telephony Gateway 28 and Authentication & Call Waiting Engine 29 may be embodied in a single carrier server or as two separate and distinct devices. Thus, the term "carrier server," as used herein, is used to refer to the physical and logical functionality of one or more of the carrier devices and servers 25-29 of FIG. 1.

To complete the discussion of FIG. 1, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB 22 and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G LTE type RANs, although such routing and control element(s) are generically included in the broad class of devices that may be used to implement the functionality of network 10 discussed here.

FIG. 2 illustrates a procedural flow for ringing of multiple secondary devices 20A-N during an incoming call to a primary device 15. In the illustrated example, the originator device 12 is in communication with the carrier network 10. To initiate the procedure, the originator device (not shown) initiates a call.

In step S210, the MSC & VoLTE switch 26 receives the call from the originator device 12. The call is set up with the caller identification ("ID") information, which includes the originating device's phone number and associated name. Continuing now to step S220, to ring the primary device 15 on the mobile network 10 using the primary MDN, the MSC & VoLTE switch 26 accesses the appropriate subscriber record in a subscriber database to validate that the primary device 15 is on the mobile network 10 and routes the call. This subscriber database is accessible to the central processing unit (CPU) of the MSC & VoLTE switch 26. MSC & VoLTE switch 26 searches the subscriber database for routing identifiers or credentials for the primary device 15 associated with the primary MDN to route the call, e.g., SIM credentials, such as the IMSI, international mobile equipment identifier ("IMEI"), mobile identification number (MIN), mobile equipment identifier (MEID), or the electronic serial number (ESN). For example, the MSC & VoLTE switch 26 confirms that the MDN is currently assigned to a primary device 15 having the hardware ESN, in a manner analogous to validating a mobile device for network operations before allowing the communication through the mobile network 10.

Moving now to step S230, the MSC/VoLTE switch 26 requests a telephony gateway address in order to set up future call legs to the secondary devices 20A-N that are registered with the primary device 15. The primary MDN that is linked to the primary device 15 is sent to the Session Router & ENUM Server 27 to serve as a key to identify the proper forwarding address, including a secondary MDN that is linked to the secondary devices 20A-N.

Continuing now to step S240, the Session Router & ENUM Server 27 retrieves and transmits a telephony gateway address that corresponds to the secondary devices 20A-N. In the example, a common address is used to register all of the secondary devices 20A-N with the Session Router & ENUM Server 27 to limit the number of lookups to just one common lookup, instead of separate lookups for a MDN belonging to each of secondary devices 20A-N. Having a single lookup improves processing time and reduces network communications overhead, such as network usage. In our example, the type of address that is sent back from the Session Router & ENUM Server 27 to the MSC & VoLTE switch 26 is a SIP URI address. Embedded within the transmitted SIP URI address as the username is the secondary MDN and the domain/IP address of the Telephony Gateway 28 is embedded as the host.

Moving to step S250, MSC & VoLTE switch 26 forwards the call to secondary devices 20A-N to Telephony Gateway 28. In order to enable the Telephony Gateway 28 to set up the call with secondary devices 20A-N, the MSC & VoLTE switch 26 sends the following parameters to Telephony Gateway 28: primary MDN, caller ID information, and the secondary MDN that identifies the secondary devices 20A-N.

Upon receiving the forwarded call and parameters from MSC & VoLTE Switch 26, in step S260, the Telephony Gateway 28 issues a request, such as via HTTP or XML to the Authentication & Call Waiting Engine 29. The request seeks a determination as to whether the subscriber is registered and authenticated to use the multiple device control service and to identify any corresponding secondary device identifier ("ID") for each secondary device 20A-N that is linked to the secondary MDN. To authenticate and obtain the secondary device IDs, Telephony Gateway 28 sends the primary MDN to the Authentication & Call Waiting Engine 29. Alternatively, Telephony Gateway 28 may send at least one secondary MDN to Authentication & Call Waiting Engine 29 in order to authenticate and retrieve the corresponding secondary device IDs. Although secondary MDN is the logical identifier that facilitates device ringing of the secondary devices 20A-N, either primary MDN or secondary MDN can be sent for authentication of the secondary devices 20A-N. The primary MDN is sent when the primary MDN is used as a key to identify/group the secondary device identifiers of secondary devices 20A-N as shown in FIG. 4B. When the secondary MDN serves as such a key, the secondary MDN is sent instead. Of note, the primary device 15 has been authenticated for ringing previously in step S220, as explained above, thus no authentication of the primary device 15 is necessary in this step.

In step S270, as explained previously, prior to querying for the secondary device identifiers associated with the primary MDN, the Authentication & Call Waiting Engine 29 verifies the primary MDN against a subscriber identity database to confirm that the subscriber associated with the primary device 15 is in good standing and registered for the secondary device ringing service. In other words, before returning any secondary device IDs, the Authentication & Call Waiting Engine 29 authenticates that the subscriber associated with the primary MDN is registered for the multiple device call control service. If the subscriber of the primary device 15 associated with the primary MDN is in good standing and registered for secondary device ringing, the Authentication & Call Waiting Engine 29 sends acknowledgement to the Telephony Gateway 28. The acknowledgment establishes that the subscriber that is associated with the primary device 15 is set up with the multi-device call control service and includes a list of all qualified secondary device IDs that are linked to secondary devices 20A-N.

To complete the description of step S270, using the primary MDN, Authentication & Call Waiting Engine 29 retrieves and transmits the secondary device IDs that are linked to the primary MDN. As discussed previously, Authentication & Call Waiting Engine 29 generates unique secondary device IDs for each of secondary devices 20A-N when the devices 20A-N are registered, and then stores the secondary device identifiers and primary MDN as a pair in the secondary device ID database. As described above, Authentication & Call Waiting Engine 29 possesses a separate rules database to limit calls to secondary devices 20A-N to particular days or times during a day. Thus, the rules restrict usage of the secondary devices 20A-N and screen the retrieved secondary device IDs in order to generate a list of qualified secondary device IDs to return to Telephony Gateway 28 for ringing.

The retrieved secondary device IDs are checked against the rule database using the current day, time, month, and year to ensure that time and date based controls are adhered to. For example, if a call is made during school or work hours to primary device 15, a rule housed in the set of rules can dictate that secondary devices 20A-N are not to be rung during those hours. If a call is received over the weekend, the rules database may further specify to only ring the associated subscriber's secondary devices 20A-N that reside at home instead of the office. The rules database may also specify a maximum number of secondary devices 20A-N that can be registered for simultaneous ringing of incoming calls or to make going outgoing calls, such as five devices.

As another example, the rules database specifies a geographic area where the secondary devices 20A-N must reside within to enable ringing of the device. Accordingly, the absolute location of the secondary devices 20A-N can be checked against this specified geographic area to control ringing communications based on such location-based restrictions. Alternatively, the rules database specifies a relative geographic location that the secondary devices 20A-N must reside within of the primary device 15 to impose device ringing restrictions. Such relative geographic restrictions can also be based on whether an exchange of messages/communications can occur via a short-range network, such as via near-field or Bluetooth communications. Accordingly, when a short-range network is established between a first secondary device of the secondary devices 20A-N and the primary device 15, ringing of the first secondary device may be enabled or disabled. However, when no such connection is established, ringing may be disabled or enabled.

Based on the rules database, only qualified secondary device IDs that meet the rules are returned to Telephony Gateway 28 for ringing. Unqualified secondary device IDs which do not comport with the rules are excluded.

In step S280, the Telephony Gateway 28 rings each of the qualified secondary devices 20A-N that are mapped to each secondary device ID in separate call legs. Using the flow outlined above the primary device 15 and secondary devices 20A-N are rung simultaneously or nearly simultaneously. When one of the call legs is answered by one of the secondary devices 20A-N, the remaining call legs to the secondary devices 20A-N and and the call leg to the primary device 15 are abandoned. The call legs may be abandoned by tearing down (e.g., disconnecting) each call session that is associated with the secondary devices 20A-N and the primary device 15.

In step S285, the Telephony Gateway 28 or other illustrated servers 26, 27, 29 and devices 15, 20A-N synchronize network-based call logs in conjunction with the multiple device ringing service. For example, when a subscriber has the primary device 15 turned off or on during the multiple device ringing service and the call is answered by one of secondary devices 20A-N, the call log belonging to the primary device 15 is updated to show that the call was answered on one of secondary devices 20A-N. The call log indicates the specific secondary device ID or a description of the specific secondary device that is linked to the secondary device ID which actually answered the incoming call, instead of reflecting a missed call. Without such call log updates, the primary device 15 would incorrectly indicate to the subscriber that the call was missed, even though the call was answered on one of the secondary devices 20A-N. After call completion on one of the secondary devices 20A-N, the call log is also updated by the Telephony Gateway 28 or other servers 26, 27, 29 to reflect that the call has been completed and the duration of the call. Of note, the call log updates of the multiple device ringing service may also be extended to video calls and integrate voicemail messages into such call log synchronization.

As discussed above, to provide call controls for multiple secondary devices 20A-N of a subscriber whose primary device 15 is subscribed to a mobile carrier network, both a secondary MDN and secondary device IDs are employed. The secondary device ID is a unique identifier that is allocated to each of secondary devices 20A-N. In one example, the secondary device ID is a virtual number that is prefixed as a subset of numbers of the primary device's 15 digit IMEI number. In another example, the secondary device ID corresponds to the IMEI of the secondary device. In yet another example, the secondary device ID is randomly generated based on the IMEI number of the primary device 15 or secondary device. A set of secondary device IDs that are associated with the IMEI of the primary device 15 can also be generated and then assigned on a rolling basis as secondary devices 20A-N are registered with the primary device 15. These approaches can advantageously give insight into a secondary device's relationship to the corresponding primary device 15 and other secondary devices 20A-N.

The generated secondary device IDs can share a fixed high set of digits that would be fixed to that subscriber and have a low set of digits that would be unique and generated randomly each time the secondary device ID is being created/allocated. In one example when the secondary device ID is 15 digits, the upper 13 digits of the set of secondary device IDs are fixed to the subscriber's primary device 15 and shared by all of the secondary devices 20A-N. The lowest two digits vary among each secondary device 20A-N in order to distinguish the devices 20A-N and allow separate communications over the network 10. Based on the matching upper 13 digits, the Telephony Gateway 28 and Authentication & Call Waiting Engine 29 know the primary 15 and secondary devices 20A-N belong to the same subscriber.

FIG. 3 is a flow chart of an example of a procedure for placing outgoing calls from a secondary device 20. Beginning in step S310, the secondary device 20 initiates an outgoing call. The corresponding outgoing call information includes information to reverse map the secondary device 20 to the primary device 15, such as the secondary MDN linked to the secondary device 20 and the secondary device ID. Also included is the target MDN of the intended recipient of the call.

In step S320, the outgoing call is intercepted by the Telephony Gateway 28. This is because in our example, the secondary MDN is a non-routable number that signifies that a secondary device 20 is originating the call. The Telephony Gateway 28 recognizes and distinguishes the secondary MDN as being a virtual MDN that is not the primary MDN belonging/assigned to the primary device 15 of the corresponding subscriber. Consequently, the Telephony Gateway 28 institutes an authentication protocol, which generates an authentication request to the Authentication & Call Waiting Engine 29, such as by way of HTTP or XML, and sends secondary device ID to the Authentication & Call Waiting Engine 29 to authenticate the secondary device 20.

Continuing now to step S330, Authentication & Call Waiting Engine 29 authenticates secondary device 20. During this step, the Authentication & Call Waiting Engine 29 does a reverse lookup of the primary MDN in the secondary device ID database based on the received secondary device ID parameter belonging to the secondary device 20. Upon retrieving the primary MDN, the Authentication & Call Waiting Engine 29 confirms that the subscriber associated with the primary MDN is in good standing and is registered for the multiple device call control service. Upon making this verification, Authentication & Call Waiting Engine 29 checks the rules set to confirm that there are no limits imposed on the use of secondary device 20 using the received secondary device ID, for example, based on time of day and day of week. For example, a rule may dictate that no outgoing calls can be made from the secondary device 20 during school or work hours. When the Authentication & Call Waiting Engine 29 confirms that the set of rules does not impose such a limitation, Authentication & Call Waiting Engine 29 sends back an acknowledgement to confirm that the secondary device 20 is permitted to place an outgoing call.

As part of that acknowledgment, Authentication & Call Waiting Engine 29 returns caller ID information, including the linked primary MDN and an associated subscriber identifier, such as a subscriber name, that is determined from the subscriber database by using the primary MDN as a key. For example, Authentication & Call Waiting Engine 29 can determine a subscriber identifier of the subscriber from a subscriber database by searching the subscriber database with the retrieved primary MDN. Accordingly, caller ID information is communicated back to the Telephony Gateway 28 in the authentication acknowledgement of secondary device 20. Of note, the rules database may be consulted before the primary MDN is retrieved to determine whether any limits are imposed on the use of secondary device 20, as explained above.

Moving now to step S340, upon receiving an acknowledgment that the secondary device 20 is authenticated and caller ID information, Telephony Gateway 28 checks whether the device associated with the target MDN is itself a subscriber of the same carrier. In steps S350 and S360, if the target MDN is linked to a subscriber of the same carrier, the call is forwarded to the MSC & VoLTE Switch 26 along with the caller ID information to set up the call with carrier subscriber device 390. Alternatively, in step S370, if the target MDN is not linked to a subscriber of the same carrier, the call is forward to the PSTN 31 along with the caller ID information to set up the call to the target MDN.

FIGS. 4A-B are examples of database structures employed to link secondary devices 20A-N with a primary device 15. With reference to FIG. 4A, the secondary MDN database table 400 shows a primary MDN column 410 with various primary MDNs that belong to corresponding primary device(s) 15. In the example, each of the primary MDNs have a number over 200 associated with the 3 upper digits, meaning the primary MDN is a routable number in the United States. The type of database table 400 illustrated is accessible by at least Session Router & ENUM Server 27 and Authentication & Call Waiting Engine 29. Session Router & ENUM Server 27 typically retrieves data from table 400 and Authentication & Call Waiting Engine 29 writes to the table to link a primary MDN to a secondary MDN after generating a secondary MDN for a primary device 15.

Shown in the secondary MDN column 420 is a single secondary MDN that is linked to the corresponding primary MDN to group together all secondary devices 20A-N belonging to the primary MDN. However, multiple secondary MDNs can be generated to maintain a distinction between each of secondary devices 20A-N that belong to the primary MDN if modularity is desired. Having separate secondary MDNs can allow for separate detachment of a particular secondary device 20 from the network 10 for enchanced security in the event of a network attack. In the example, each of the secondary MDNs have a number below 200 associated with the 3 upper digits, meaning the secondary MDN is not a routable number.

As shown in FIG. 4B, the secondary device ID database table 430 houses a column of primary MDNs 440. The type of database table 430 illustrated is accessible by at least Authentication & Call Waiting Engine 29. In the illustration, the primary MDN can have any number of associated unique secondary device identifiers 450, each of which establishes a link to corresponding secondary devices 20A-N. Shown in the first secondary device ID column 450 is a 15 digit identifier, such as an IMEI number. The secondary device ID may be the actual IMEI of the corresponding secondary device. Alternatively, secondary device ID can be an identifier that Authentication & Call Waiting Engine 29 dynamically or randomly generates and then stores in table 430.

FIG. 4C is an example of database structure to provide rule-based routing to secondary devices 20A-N based on a carrier network subscriber's preferences. The type of database table 460 illustrated is accessible by at least Authentication & Call Waiting Engine 29. In the illustration, the secondary device ID in secondary device ID column 470 can have any number of rules 480, 490, each of which establishes controls to restrict the usage of corresponding secondary devices 20A-N. Shown in the first rule column 480 are rules that inhibit or exclude the ringing of four different secondary devices at certain times of day and days of the week. In the second rule column 490, an additional rule is shown that prevents the ringing of the associated secondary device on certain days of the week, in this case, Saturday and Sunday. Based on the rules, Authentication & Call Waiting Engine 29 cancels routing of incoming calls to the secondary devices 20A-N that are linked to the secondary device IDs when the rule criteria are not met. The rules here also used to foreclose outgoing calls from being placed on the corresponding secondary devices 20A-N.

Figure 5:
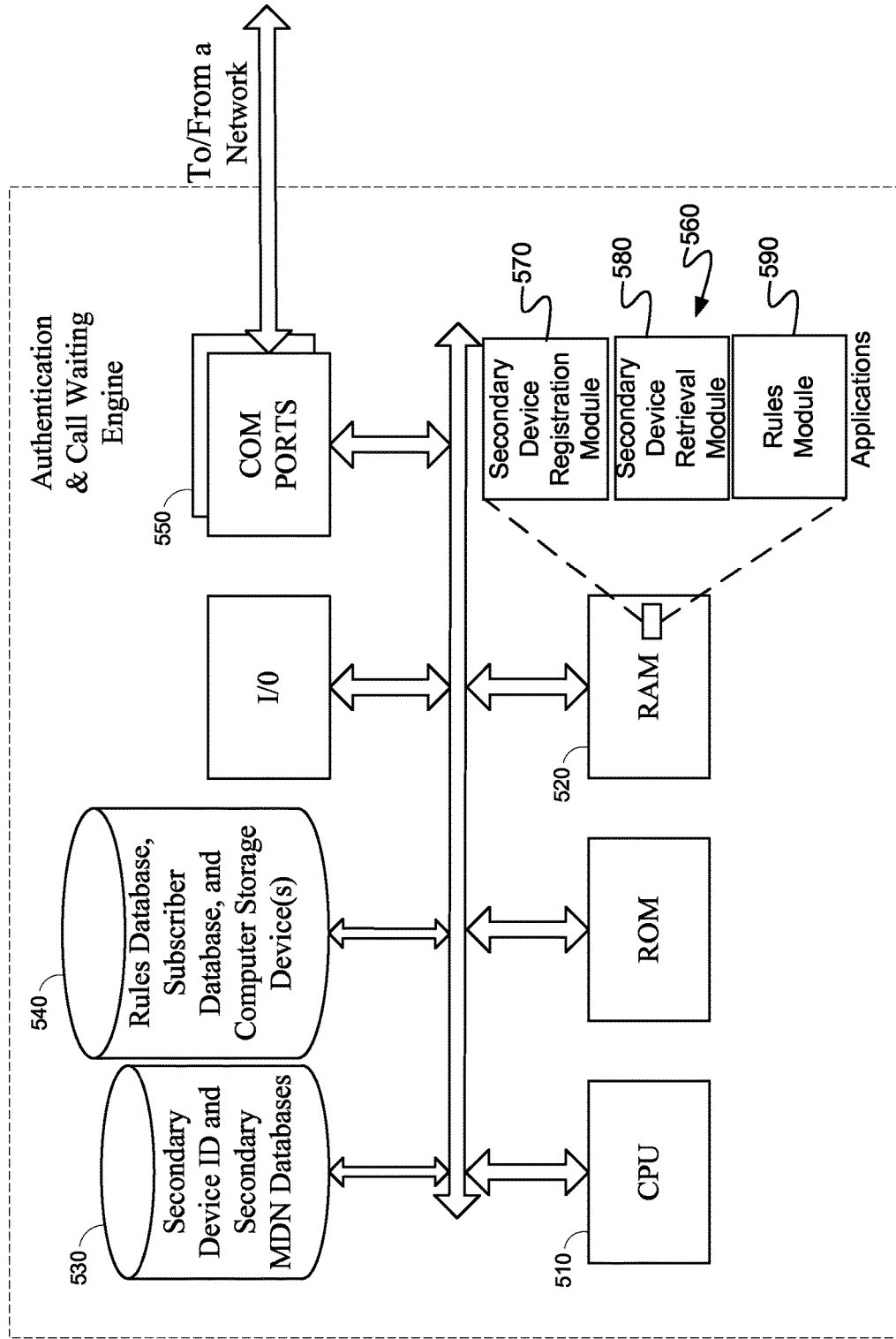
FIG. 5 is a simplified functional block diagram of a computer that may be configured as a carrier server or host to function as any of the computer platforms in FIG. 1, for example, the Authentication and Call Waiting Engine shown in the system of FIG. 1.

FIG. 5 is a simplified functional block diagram of a computer that may be configured as a server or host to function as any of the computer platforms in FIG. 1, for example, the Authentication & Call Waiting Engine 29 shown in the system 5 of FIG. 1.

The Authentication & Call Waiting Engine 29 includes a CPU 510, in the form of one or more processors, for executing program instructions. Although the processor(s) forming the CPU 510 may be similar to the microprocessor used in the primary device 15 of FIG. 6, host or server computer platforms typically use somewhat different circuit architectures, e.g. to provide more processor power. Authentication & Call Waiting Engine 29 also includes a memory 520, shown as RAM, that is accessible to the processor to execute various programming instructions. The memory 520 typically stores programming, such that execution of the programming by the processor 510 configures the Authentication & Call Waiting Engine 29 to perform the functions or procedures as described above. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the Authentication & Call Waiting Engine 29 is shown as including the secondary device ID and secondary MDN databases 530 discussed earlier. The secondary device ID and secondary MDN databases 530 are accessible to the central processing unit (CPU) 510 of the Authentication & Call Waiting Engine 29. Additional databases and computer storage device(s) 540 are also accessible, such as those storing the rules database, subscriber information databases (e.g., primary MDN with subscriber name identity for caller ID purposes), billing procedures, list of enrolled services, etc.

As outlined earlier, the multiple device call transfer control processing effectuated by Authentication & Call Waiting Engine 29 involves receiving MDNs and device IDs for authentication purposes as well as establishing incoming and outgoing calls to/from secondary devices 20A-N. The data may be obtained in several different ways, including from secondary devices 20A-N, Telephony Gateway 28, and Session Router & ENUM Server 27.

For packet data communication, Authentication & Call Waiting Engine 29 includes a data/network communication interface, shown generally as com ports 550. The com ports 550 may use any available data communication technology. In a fixed installation, for example, the com ports 550 may include an Ethernet interface card for communication over appropriate data network wiring. For a wireless implementation, the com ports 550 may include a WiFi transceiver. The com ports 550 allow the Authentication & Call Waiting Engine 29 to communicate with other devices and systems, such as Telephony Gateway 28.

In the illustration, Authentication & Call Waiting Engine 29 includes several applications 560 stored in RAM 520. Specifically, Authentication & Call Waiting Engine 29 includes a secondary device registration module 570, secondary device retrieval module 580, and rules module 590. In general, the term "module," as used herein, refers to logic embodied in hardware or software instructions, which can be written in a programming language, such as Java™, C, C++, for example. A software module can be compiled into executable programs or written in interpreted programming languages, such as Perl or Visual Basic script. Software modules may be callable from other modules or themselves. Generally, the modules described herein refer to logical modules that may be merged with other modules or divided into sub-modules despite their physical organization. The modules can be stored in any type of computer readable medium or computer storage device and be executed by one or more general purpose computers. In addition, the methods and processes disclosed herein can alternatively be embodied in specialized computer hardware or an application specific integrated circuit ("ASIC").

The secondary device registration module 570 registers secondary devices 20A-N for the multiple device call and ringing services, generates secondary MDNs and secondary device IDs, and updates secondary device ID and secondary MDN databases 530. Secondary device retrieval module 580 performs the authentication functions described earlier to ensure that the holder of the primary device 15, or subscriber, is registered for the multi-device control service. The secondary device retrieval module 580 also searches the secondary device ID database 530 to find the secondary device IDs of secondary devices 20A-N. For example, during an incoming call, the secondary device retrieval module 580 uses the primary MDN as a key to look up the linked secondary device IDs. Finally, secondary device retrieval module 580 performs reverse lookups in secondary device ID database 530 during outgoing calls from secondary devices 20A-N to retrieve the corresponding primary MDN and retrieves the subscriber identifier belonging to that primary MDN from the subscriber database 540. The rules module 590 effectuates the rule-based processing describer earlier, including allowing rules to be generated by a subscriber as an initial matter, and then subsequently accessing the rules database 540 to limit calls to secondary devices 20A-N in compliance with the stored rule set.

Figure 6:
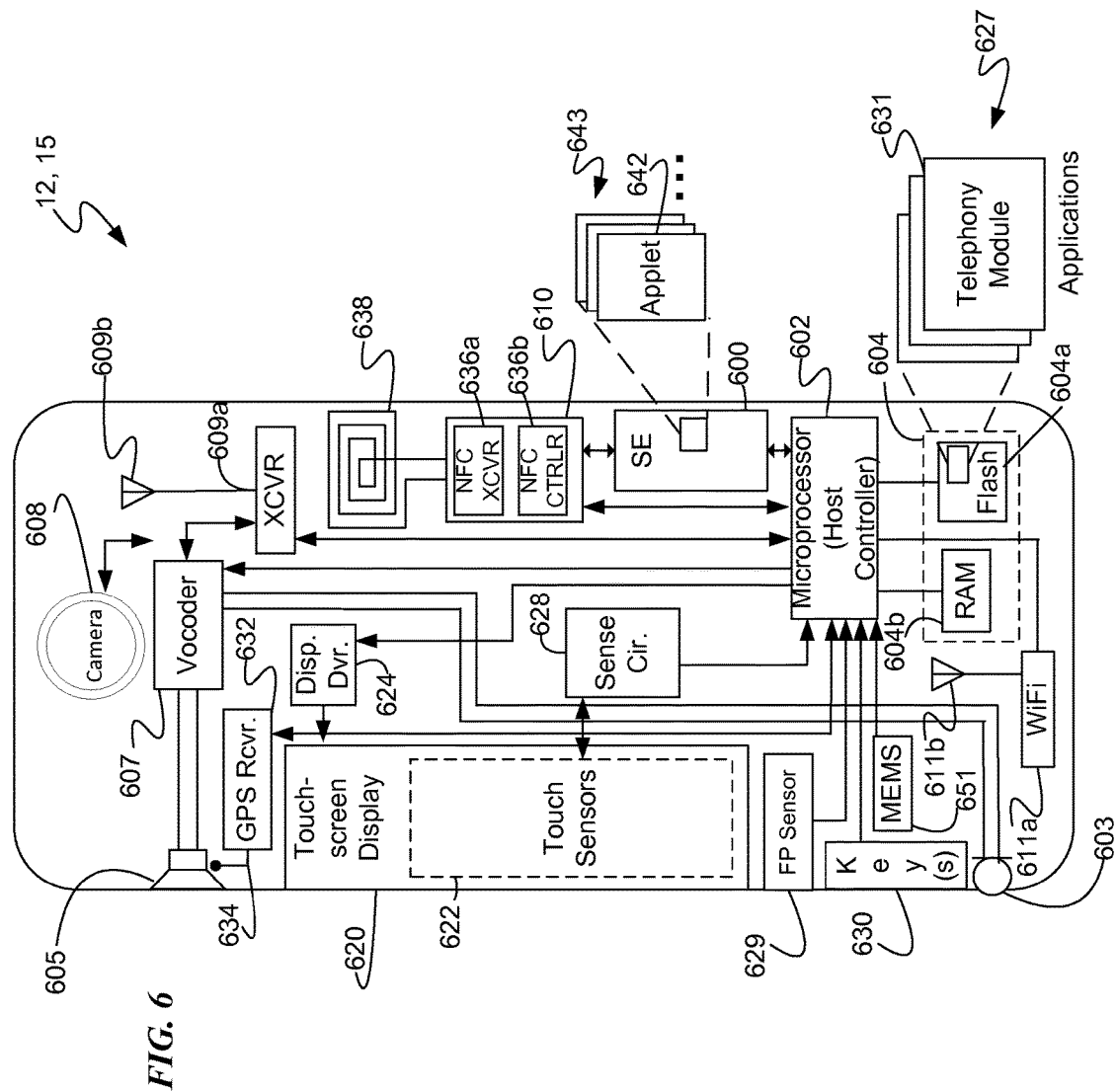
FIG. 6 is a high-level functional block diagram of a mobile device, which may be a primary device or an originator device that communicate via the system of FIG. 1.

FIG. 6 is a high-level functional block diagram of an example of a mobile device that may be an originator device 12 or a primary device 15 in the system of FIG. 1. Although shown as including the same elements for both devices, different mobile devices may be implemented using somewhat different elements.

Shown are elements of a touch screen type of devices 12, 15, although other non-touch type mobile devices can be used in the call control operations under consideration here. Although referred to as an example of originator and primary devices 12, 15, some secondary devices 20A-N may utilize similar elements. Examples of touch screen type mobile devices that may be used to implement devices 12, 15 may include (but are not limited to) a smart phone, a personal digital assistant (PDA), a tablet computer or other portable device with biometric sensing capability. However, the structure and operation of the touch screen type devices 12, 15 is provided by way of example; and the subject technology as described herein is not intended to be limited thereto. For purposes of this discussion, FIG. 6 therefore provides a block diagram illustration of the example of devices 12, 15 having a touch screen display for displaying content and receiving user input as (or as part of) the user interface.

Although the activities that are the focus of discussions here involve voice communications, a typical mobile device such as originator and primary devices 12, 15, also support data communications. Hence, in the example shown in FIG. 6, each of the devices 12, 15 include a microphone 603 for audio signal input and a speaker 605 for audio signal output. The microphone 603 and speaker 605 are communicatively coupled to a voice or audio encoder/decoder (vocoder) 607. For a voice telephone call, for example, the vocoder 607 provides two-way conversion between analog audio signals representing speech or other audio and digital samples at a compressed bit rate compatible with the digital protocol of wireless telephone network communications or voice over packet (e.g., Internet Protocol) communications.

The vocoder, speaker and microphone may also be used as elements of the user interface during other operations of the device, including some types of authentication communications. For example, audible prompts may be output via the speaker. Also, if one of the user authentication factors called for involves a speech input, e.g. for voice print verification, the mobile device would receive the user's speech input via the microphone 603, and the vocoder 607 would digitize that speech input for further processing.

Also, as shown in FIG. 6, the originator and primary devices 12, 15 include at least one digital transceiver (XCVR) 609a, for digital wireless communications via a wide area wireless mobile communication network, although the devices 12, 15 may include additional digital or analog transceivers (not shown). The transceiver 609a conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 609a provides two-way wireless communication of information including digitized audio signals, still image and/or video signals, web page information for display as well as web related inputs, and various types of mobile message communications to/from the originator and primary devices 12, 15.

Several of these types of communications through the transceiver 609a and a network, as discussed previously, relate to protocols and procedures in support of a multiple device call controls. Such communications, for example, may utilize IP packet data transport utilizing the digital wireless transceiver (XCVR) 609a and over the air communications to and from a base station 22, the traffic portion of network 10, the Intranet 21 to and from the carrier devices and servers 25-29 shown in FIG. 1.

In one example, the transceiver 609a also sends and receives a variety of signaling messages in support of various voice and data services provided by a network of a wireless service provider, to users of originator and primary devices 12, 15 via the mobile communication network 10. Transceiver 609a connects through radio frequency (RF) send-and-receive amplifiers (not shown) to an antenna 609b. Transceiver 609a may also support various types of mobile messaging services, such as short message service (SMS), enhanced messaging service (EMS), and/or multimedia messaging service (MMS). Although transaction communications involving data for multiple device call controls typically utilize IP data transport, such transaction communications may at times utilize one or more of these mobile messaging services for the data transport of some or all of the relevant data through the mobile communication network 10.

Many modern mobile originator and primary devices 12, 15 also support wireless local area network communications over WiFi, instead of or in addition to data communications using the wide area mobile communication network. Hence, in the example of FIG. 6, for packet data communications, the devices 12, 15 may also include a WiFi transceiver 611a and associated antenna 611b. Although WiFi is used here as the example, the transceiver 611a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 611a, for example, may provide two-way data transport for wireless communication with a wireless access point in a residence or enterprise that the user frequents or with any available hotspot offered in a public venue. A WiFi access point, such as that shown as Wi-Fi connection 51 in FIG. 1, communicates with compatible user equipment, such as the devices 12, 15, over the air using the applicable WiFi protocol. The WiFi access point provides network connectivity, usually to the public Internet 30. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 611*a* supports various types of data communications similar to the packet data communications supported via the mobile network transceiver 609*a*, including communications related to communications to and from carrier devices and servers 25-29 and the other devices shown in FIG. 1.

Although not separately shown, another transceiver may be included for short range communication, e.g., in accordance with the Bluetooth standard.

The originator and primary devices 12, 15 further include a microprocessor, sometimes referred to herein as the host controller 602. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 602, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in originator and primary devices 12, 15 or secondary devices 20A-N (e.g. FIG. 7), carrier devices and server computers (e.g. FIG. 5), network elements, etc.

Returning more specifically to the originator and primary devices 12, 15 example of FIG. 6, the microprocessor 602 serves as a programmable host controller for devices 12, 15 by configuring devices 12, 15 to perform various operations, for example, in accordance with instructions or programming executable by processor 602. For example, such operations may include various general operations of the devices 12, 15 as well as operations related to communications with carrier devices and servers 25-29 and secondary devices 20A-N. Although a processor may be configured by use of hardwired logic, typical processors in mobile devices are general processing circuits configured by execution of programming.

The originator and primary devices 12, 15 include a memory or storage system 604, for storing data and programming. In the example, the memory system 604 may include a flash memory 604*a* and a random access memory (RAM) 604*b*. The RAM 604*b* serves as short term storage for instructions and data being handled by the processor 602, e.g. as a working data processing memory. The flash memory 604*a* typically provides longer term storage.

Hence, in the example of originator and primary devices 12, 15, the flash memory 604*a* is used to store programming or instructions for execution by the processor 602. Depending on the type of device, the devices 12, 15 store and run an operating system through which specific applications may be run on the device. Examples of operating systems include Android, Apple iOS (I-Phone or iPad devices), Windows Mobile, RIM BlackBerry operating system, or the like. Flash memory 604*a* may also be used to store mobile configuration settings for different mobile applications or services executable at devices 12, 15 using processor 602.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement telephony and any other device functions associated with multiple device call transfer and control protocols. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 604*a*, 604*b* of memory system 604, or a memory of a computer used to download or otherwise install such programming into the mobile device, or a transportable storage device or a communications medium for carrying program for installation in the originator and primary devices 12, 15.

In the example, the flash memory 604*a* stores a number of applications 627 for execution by the microprocessor-based host controller 602, typically through operation/execution of the device operating system. Of note, for purposes of the present discussion, the flash memory 604 stores a telephony module (app) 631 as one of the programs 627 for execution by the microprocessor 602. For example, the telephony module 631 may be installed as part of enrollment with the mobile carrier network. Alternatively, the telephony module 631 may be pre-installed on the originator and primary devices 12, 15 at manufacture or activation on the network.

In the example, execution of the telephony module 631 by the microprocessor 602 configures originator and primary devices 12, 15 to perform a variety of functions, particularly placing outgoing calls and receiving incoming calls on a mobile device network 10. In addition, telephony module 631 of the primary device 15 engages in authentication functions when secondary devices 20A-N are being registered for the multiple device call transfer service. For example, when secondary devices 20A-N are being registered, primary device 15 may prompt the subscriber to enter a passcode, biometric input, or request another authentication mechanism to confirm that the subscriber desires to register secondary devices 20A-N with the service. This serves as a secondary check to avoid fraudulent registry of secondary devices 20A-N by an intruder seeking to gain unauthorized access to a subscriber's incoming calls and forge outgoing calls from the primary device 15.

In the illustrated example, the originator and primary devices 12, 15 include a secure component 600. The secure component 600 (e.g. a secure element or "SE") may be provisioned as a section within the memory 604 or may take the form of a universal integrated circuit card ("UICC") located within the devices 12, 15. A common example of a UICC implementation of the SE 600 is a subscriber identity module ("SIM"). As discussed above, the SE 600 provides secure storage for various identifiers associated with the devices 12, 15. The SE typically has a unique identifier and is provisioned for operation of the originator and primary devices 12, 15 in the network 10 by storage of a MDN and/or MIN assigned to the devices 12, 15 by the carrier network operator.

The secure component contains applications that use secure keys running inside the secure processor. Although similar to other applications, the applications for the secure processor are sometimes smaller and sometimes referred to as applets 643. In an example, telephony module 631 may be an applet residing in the SE 600. For example, there may be at least one applet 642 to engage in communications via network 10 to authenticate devices 12, 15 and securely transmit identification credentials, such as SIM credentials.

The originator and primary devices 12, 15 also include an image input device. Although available for other uses, the imager 608 is another of the elements of the devices 12, 15 that may be used for biometric inputs, including input of user authentication factors, for secure registration of secondary devices 20A-N. Hence, the processor 602 is coupled to at least one imager 608, which in a typical example is a digital camera. Although the drawing shows a single imager/camera 608, for convenience, it should be appreciated that the devices 12, 15 may have two or more cameras. Many such devices 12, 15 today include front and rear facing cameras. Also, devices 12, 15 may have multiple cameras on the front and/or rear side, for example, to support three-dimensional (3D) imaging applications for authentication and other applications.

The originator and primary devices 12, 15 supporting multiple device call transfer protocols of the type under consideration here may include a variety of different types of physical user interface elements. For discussion purposes, in the devices 12, 15 shown in FIG. 6, the physical user interface elements of devices 12, 15 include a touch screen display 620 (also referred to herein as "touch screen 620" or "display 620"). For output purposes, the touch screen 620 includes a display screen, such as a liquid crystal display (LCD) or the like. The display may be used for part of the user interaction during user authentication in the secondary devices 20A-N registration process, e.g. to display icons or other information to prompt the user to input one or more of the user authentication factors called for by an applicable authentication rule set. For input purposes, touch screen display 620 includes a plurality of touch sensors 622. Touch sensors 622 may be used as a biometric sensor that captures a biometric factor, e.g., a touch gesture. Some touch screens incorporate a fingerprint sensor that may be used as another biometric authentication factor input.

Other user interface or biometric input elements may include the imager/camera 608 and a keypad including one or more keys 630. As noted earlier, the camera/imager 608, for example, may be used as a biometric sensor that captures a biometric factor, e.g., an image of the user's face or a retina.

A keypad may be implemented in hardware as a physical keyboard of originator and primary devices 12, 15, and keys may correspond to hardware keys of such a keyboard. Alternatively, some or all of the keys 630 (and keyboard) of devices 12, 15 may be implemented as "soft keys" of a virtual keyboard graphically represented in an appropriate arrangement via touch screen display 620. The soft keys presented on the touch screen display 620 may allow the user of devices 12, 15 to invoke the same user interface functions as with the physical hardware keys for authentication purposes.

In some implementations, the microphone 603 and speaker 605 may be used as additional user interface elements, for audio input and output, including with respect to some functions related to the authentication processing and communication, as described herein. As noted, another input for an authentication factor would be a speech input via the microphone 603, either for voice print recognition of the user of for speech input of a passcode, such as during the registration process of secondary devices 20A-N.

In general, touch screen display 620 and touch sensors 622 (and one or more keys 630, if included) are used to provide a textual and graphical user interface for the originator and primary devices 12, 15. In an example, touch screen display 620 provides viewable content to the user at devices 12, 15. Touch screen display 620 also enables the user to interact directly with the viewable content provided in the content display area, typically by touching the surface of the screen with a finger or an implement such as a stylus. For example, when an icon of a face is displayed by the telephony module 631, to prompt user input of a facial image, the user can touch the face icon to activate the camera 608 for the appropriate input of the currently required facial image type user authentication factor when secondary devices 20A-N are being registered.

In some implementations, touch screen display 620 is a capacitive touch screen display, and touch sensors 622 are independent capacitors arranged as a grid and disposed at various points throughout a transparent conductive material (e.g., indium tin oxide) that is layered onto a hard surface composed of insulating material (e.g., glass). As another example, the respective locations of touch sensors 622 (e.g., capacitors) may correspond to different intersection points of a matrix of rows and columns of the layered conductive material. Alternatively, touch sensors 622 may include a grid of capacitive electrodes formed of one or more layers of transparent conductive material etched onto a sheet of hard insulating material, as described above. However, it should be noted that touch screen display 620 is not limited to either of the above-described implementations. Accordingly, touch screen display 620 may be implemented using any of various conventional or other techniques based on, for example, the type of touch screen technology desired for a particular implementation of devices 12, 15.

User input via the touch screen display 620 includes touch of the display device with the user's finger, stylus or similar type of peripheral device used for user input with a touch screen. At least in some capacitive screen examples, when current is applied to touch screen display 620, user input can be detected by touch sensors 622 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 620.

As shown in FIG. 6, the originator and primary devices 12, 15 also include a sense circuit 628 coupled to touch sensors 622 for detecting the occurrence and relative location/position of each touch with respect to a content display area of touch screen display 620. In this example, sense circuit 628 is configured to provide processor 602 with touch-position information based on user input received via touch sensors 622. In some implementations, processor 602 is configured to correlate the touch position information to specific content being displayed within the content display area on touch screen display 620. The touch-position information captured by the sense circuit 628 and provided to processor 602 may include, but is not limited to, coordinates identifying the location of each detected touch with respect to the display area of touch screen display 620 and a timestamp corresponding to each detected touch position.

The information provided by the sense circuit 628 may include, for example, a series of different locations of touch points/positions detected across the content display area of touch screen display 620 over a predetermined period of time. The location and time information for a series of continuous touch points/positions can be used by processor 602 to track the movement of the user's finger(s) (or other input device) across the touch screen display 620. This information also may be used to track various parameters including, but not limited to, the direction and speed of finger movement based on changes between the different touch positions over time. The information tracked by the sense circuit 628 is used by processor 602 to detect various points of touching as well as different types of touch gestures, for enabling the processor and thus the originator and primary devices 12, 15 to perform operations in accordance with each touch or touch gesture. For example, the devices 12, 15 may utilize such touch sensing and processing technology to detect a touch gestural input as another type of biometric input for a factor for user authentication when registering secondary devices 20A-N.

Another type of gestural detection that may be used as an input for a factor for user authentication is detection of movement of the originator and primary devices 12, 15. Hence, the illustrated example of devices 12, 15 also includes one or more motion sensors, such an accelerometer and/or a gyroscope and associated circuitry for signaling microprocessor 602 in response to detected motion input, which are implemented in the example by a Micro-Electro-Mechanical System (MEMS) 651.

The detected motion input may include, for example, a change in orientation of the physical device within three-dimensional space, as well as a determined rate of change in position of the device, in this way, originator and primary devices 12, 15 can use motion sensing by sensors of the MEMS 651 to monitor and track the detected motion or physical movement of the devices 12, 15. The tracked motion detected by MEMS sensing can be used by microprocessor 602 to determine whether the rate of such movement corresponds to a pattern of movement associated with the predetermined physical gesture. The telephony module 631 in turn can cause the primary device 15 to issue a prompt and subsequently obtain motion detection from the MEMS 651 as an indication of gestural movement of the primary device 15 by the current user, for use as a user authentication factor when registering secondary devices 20A-N. Another type of input element usable for authentication factor input is the fingerprint (FP) sensor 629. Although a camera such as 608 might be used for fingerprint sensing, a number of models of mobile devices today come equipped with a separate scanner or sensor for detecting a fingerprint as a user touches or moves their finger across the sensor 629. As noted, a fingerprint sensor may also be implemented as an element of or in combination with the touch sensors of the touch screen display.

The user interface capabilities of originator and primary devices 12, 15 provide output to and receive input from the user of the devices 12, 15, for any of the various functions, operations or applications of the device. For example, the telephony module 631 configures the devices 12, 15 to prompt for and obtain various user inputs to authenticate secondary devices 20A-N. These inputs can include identifiers, such as subscriber authentication factors. The subscriber will input authentication factors via the appropriate hardware elements at appropriate points during the secondary device registration procedure, such as via the user operating an input element such as the touch screen. In some cases, the relevant subscriber authentication information may be input other ways, for example, via communications with equipment or systems, such as carrier devices and servers 25-29 of FIG. 1.

As an example supporting short range wireless communication for registering secondary devices 20A-N, the illustrated originator and primary devices 12, 15 have near-field communications ("NFC") capability. In our example, primary device 15 can use NFC to quickly register and authenticate secondary devices 20A-N for multiple device call transfer with Authentication & Call Waiting Engine 29. NFC is a set of standards for smart phones and similar devices, such as the originator and primary devices 12, 15 and secondary devices 20A-discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device includes a transceiver configured to communicate with other NFC capable equipment.

The illustrated originator and primary devices 12, 15 further includes an NFC sensor. The NFC sensor may be implemented in a variety of ways. In the devices 12, 15 of FIG. 6, the NFC sensor includes an NFC type radio frequency transceiver 636a, which is formed by an NFC chipset 610. The NFC chipset 610 provides two-way wireless communication of information in accordance with NFC technology and protocols. The NFC chipset 610 includes an NFC controller 636b. For simplicity, the NFC chipset 610 is sometimes referred to herein as the NFC controller or module 610, while it will be understood that there is a controller 636b within the NFC chipset 610. The NFC sensor also includes an antenna, such as coil antenna 638. The NFC chipset 610 of devices 12, 15 connects to the NFC coil antenna 638, for transmitting and receiving NFC communications to/from other NFC compatible devices with compatible transceivers over short air link distances. The transceiver 636a formed by the NFC chipset 610 also sends and receives a variety of signaling messages for establishing NFC links with other NFC-enabled devices and sends and receives various user data over the established NFC links. The signaling, for example, may allow the transceiver formed by the NFC chipset 610 of primary device 15 to detect proximity of NFC capable secondary devices 20A-N. Subsequently, the signaling establishes an NFC link between primary device 15 and secondary devices 20A-N, triggers execution of an appropriate application within the primary device 15, such as telephony module 631, and secondary devices 20A-N, such as secondary device call module 731. The NFC link then sends and/or receives data for the application(s) between the primary device 15 and the secondary devices 20A-N in order to register secondary devices 20A-N with Authentication & Call Waiting Engine 29.

Some modern mobile devices are already equipped with such NFC equipment, and increased NFC deployment is expected in the future. Such NFC communication is another form of communication that may be involved in multiple device call transfer control registration process. For example, if bumped with a NFC capable secondary devices 20A-N, the device secondary device registration can take place over NFC with the primary device 15 serving as the authentication mechanism and conduit to communicate with the carrier devices and servers 25-29 during registration.

There are a variety of ways that originator and primary devices 12, 15 may be configured to obtain information as to current location of the device. In one example, the devices 12, 15 include a global positioning satellite (GPS) receiver 632 and associated antenna 634. GPS is a space-based satellite navigation system that provides location and time information anywhere on Earth, where there is an unobstructed line of sight to at least three of the GPS satellites. The mobile network may provide information to assist in a GPS based location determination. Also, the mobile device may be configured to determine its location in other ways, for example, when GPS determination is unavailable (e.g. when signals are blocked by building structures or the like.

The telephony module 431 can configure the primary device 15 to determine the location of primary device 15 when registering secondary devices 20A-N, particularly when NFC or another short-range communication methodology is established between devices 15, 20A-N during the registration process. This is done in order to ascertain the address to couple with the secondary device ID in the secondary device ID database table 430 of FIG. 4B. Thus, the legally required location information can be provided during outgoing 911 calls from registered secondary devices 20A-N. Alternatively, when a short-range network link is not established during registration of secondary devices 20A-N, the subscriber is prompted to manually enter or select the address to attach to the corresponding secondary device ID in the secondary device ID database table 430. The structure and operation of originator and primary devices 12, 15, as outlined above, were described by way of example only.

Figure 7:
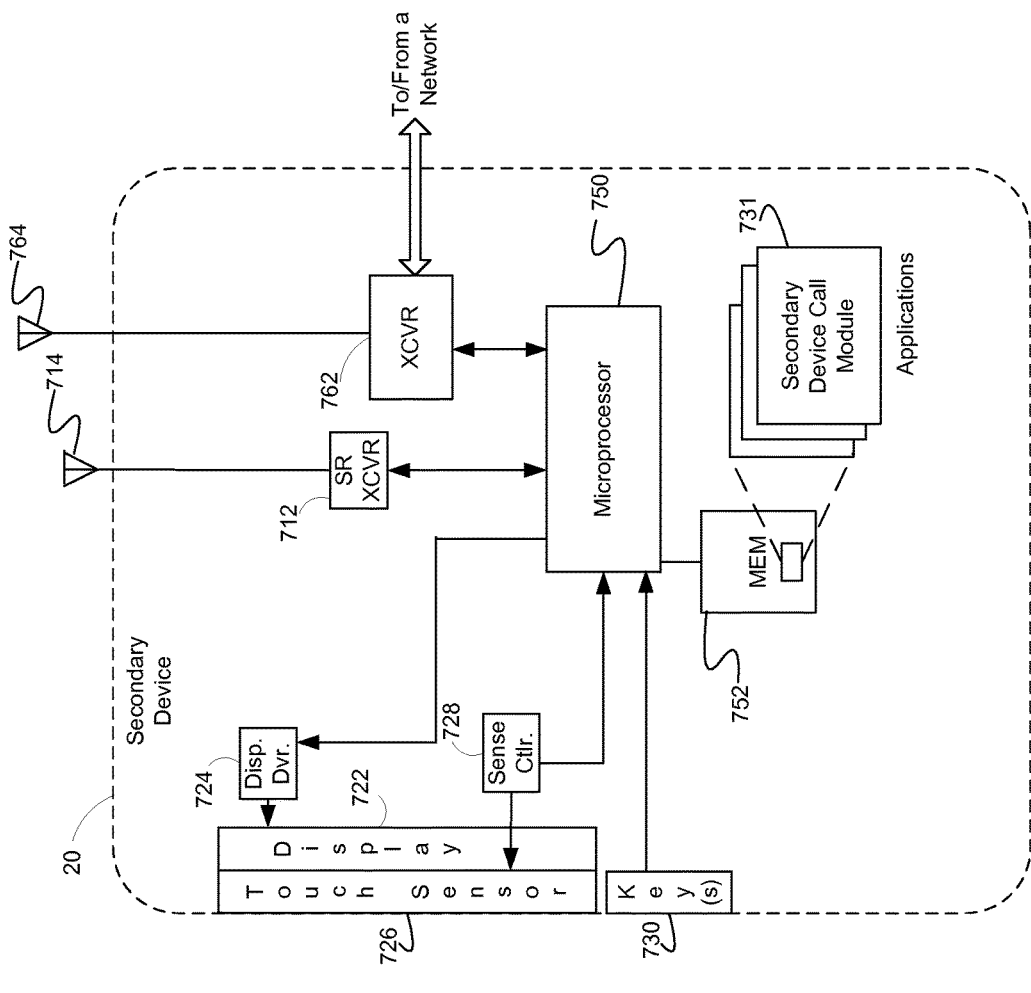
FIG. 7 is a high-level functional block diagram of a secondary device that communicates via the system of FIG. 1.

FIG. 7 is a high-level functional block diagram of a secondary device 20 that communicates via the system of FIG. 1. By way of example, the secondary device 20 may be implemented as a tablet computer including many of the same elements as the originator and primary devices 12, 15 of FIG. 6.

The secondary device 20 shown in FIG. 7 includes a display 722 and touch sensor 726 controlled by display driver 724 and sense control circuit 728 respectively. The secondary device 20 may also include keys 730 that provide additional input. Although they may be arranged/sized somewhat differently, the elements 722 to 728 are generally similar to the display, touch sensor, display driver and sense control circuit discussed above relative to the mobile originator and primary devices 12, 15 example of FIG. 6. Of course other user interface hardware components may be used in place of or instead of the display, touch sensor and keys, depending on the expected type of secondary device 20A-N (e.g., laptop computers).

Like the earlier equipment examples, secondary device 20 includes one or more processor circuits implementing a CPU functionality for data processing and operational control. Although a microcontroller or other type of processor circuit may be used, in the example, the CPU processor of the secondary device 20 takes the form of a microprocessor 750. The structure of the microprocessor 750 may be similar to that of microprocessors discussed earlier.

Programs and data for the microprocessor 750 are stored in a memory 752. Similar to the originator and primary devices 12, 15, the memory 752 may include both random access memory and flash memory, or even a SE, although fixed implementations of the secondary device 20 can be less constrained by the size and power constraints for mobile devices and therefore can use a wider variety of memory types to best suit the expected functionality of the secondary device 20 type.

The secondary device 20 also includes a short range transceiver 712 coupled to an antenna 714. The short range transceiver 712 may include one or more of a Bluetooth transceiver, a Bluetooth low-energy (BLE) transceiver, an NFC transceiver, a radio frequency identifier (RFID) transceiver, an ultrasonic transceiver or an infrared transceiver. Furthermore, although it is shown as a transceiver, it may be a receiver instead. In an implementation discussed with respect to registration of secondary device 20 for the multi-device call transfer control service, the short range transceiver 712 includes a NFC transceiver. The NFC elements of secondary device 20 may be generally similar to the NFC elements 610, 638 of the originator and primary devices 12, 15 example of FIG. 6.

The secondary device 20 also includes a data communication interface for packet data communication, shown as a transceiver (XCVR) 762, which is coupled to antenna 764. Transceiver 762 engages in digital wireless communications via a wide area wireless mobile communication network or using WiFi. Transceiver 762 allows the secondary device 20 to communicate with originator and primary devices 12, 15 and carrier devices and server systems 25-29, such as Telephony Gateway 28. In addition, the secondary device 20 may include additional digital or analog transceivers (not shown).

The keys 730, display driver 724, sense control circuit 768, transceiver 762, short range transceiver 716 and memory 752 are all coupled to the microprocessor 750. Operation of secondary device 20 is controlled by microprocessor execution of programming from the memory 752. In the illustration, memory 752 includes secondary device call module 731 (*app*) to conduct communications and processing for call control and protocols in support of the secondary device 20, as discussed in the earlier procedures. Secondary device call module 731 tracks the secondary device ID and secondary MDN that belongs to the secondary device 20 and conducts communication with Telephony Gateway 28, among other carrier devices and servers 25-29.

The secondary device call module 731 may be installed as part of enrollment of the secondary device 20 for the multiple device call transfer service with the mobile carrier network. Alternatively, the secondary device call module 731 may be pre-installed at manufacture or activation on the network but then configured or provisioned in an appropriate manner for use when the customer completes the enrollment for the multiple device call control service.

The secondary device call module 731 may be an application developed and distributed to one or more secondary devices 20A-N owned by various subscribers by the entity operating the carrier devices and servers 25-29, e.g. the mobile network carrier in our example; or secondary device call module 731 may be an application developed and distributed to a subscriber's secondary device 20 through an application store, such as Apple iTunes® or Google Play®. Depending on the arrangements between the entities, the secondary device call module 731 on the secondary device 20 may be branded to indicate the identity of one or more of those involved enterprises to the device user. The secondary device call module 731 may be a standalone application as shown, for example, as would be individual selected by the user for launch as outlined above. The secondary device call module 731, however, may have an application program interface (API) which allows other applications to call and launch the secondary device call module 731 for incoming and outgoing calls, e.g. when the user of secondary device 20 elects to share access to the carrier network 10 with other applications.

Although the functions for multiple device call controls and protocols in the secondary device 20, for example, are configured by use of a software "application," or "module" in our example, it should be apparent that the software to configure the device to perform the functions under consideration here may be implemented and deployed in other ways. For example, the programming to configure the microprocessor 750 and thus the secondary device 20 for the call transfer protocols may be integrated into the device operating system or otherwise part of the native device programming and pre-installed with the operating system or downloaded as part of an operating system or native programming upgrade.

The user (e.g., subscriber) launches the secondary device call module 731, for example, by selecting or touching an icon for that application 731 displayed on the touchscreen display of the secondary device 20. Start-up of the secondary device call module 731 may involve a prompt, input and verification of a security factor received from the device user, such as a password, a spoken audible input (or voice print) or a fingerprint scan. If required by the secondary device call module 731 launch procedure, the input factor may be temporarily saved for later use by the secondary device call module 731 during its processing of the transaction, for example, when authenticating or negotiating with carrier devices and servers 25-29, such as Telephony Gateway 28.

As noted above, carriers are legally mandated to provide the location of devices that place 911 calls. When secondary devices 20A-N include a GPS system similar to that of devices 12, 15 as discussed in reference to FIG. 6, the location can be forwarded on with the secondary device ID, secondary MDN, etc. by secondary device call module 731 in the event that an outgoing call is placed. Certain types of secondary devices 20A-N may not include a GPS system. To ensure compliance with the rules, secondary device call module 731 requests the user of the device to enter in the address of the secondary device 20 during the registration process. The address is typically stored as a column in the database table 430 of FIG. 4B and paired with secondary device ID 450. Based on this address, the multiple device call control solution can meet the legal requirements to provide location information during an outgoing 911 call placed by secondary devices 20A-N.

Aspects of the methods of multiple device call transfer controls and protocols as outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the originator device 12, primary device 15, secondary devices 20A-N, or carrier devices and server platforms 25-29 (e.g., Authentication & Call Waiting Engine 29), so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the carrier or other enterprise offering the multiple device call transfer controls into the computer platform of the Authentication & Call Waiting Engine 29, downloading the telephony module 631 into the primary device 15, or downloading secondary device call module 731 into any or all of the secondary devices 20A-N. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An Authentication and Call Waiting Engine comprising:
    a network communication interface;
    a processor;
    a memory accessible to the processor; and
    programming in the memory, wherein execution of the programming by the processor configures the Authentication and Call Waiting Engine to perform functions, including functions to:
        receive a request from a Telephony Gateway to retrieve identifiers of a plurality of secondary devices that are linked to a primary mobile directory number ("MDN") of a primary device, the request including the primary MDN;
        retrieve a secondary device identifier ("ID") for each of the plurality of secondary devices that are paired with the primary device by searching a secondary device ID database table with the primary MDN to find all linked secondary device IDs;
        generate a list of qualified secondary device IDs that do not violate usage rules imposed on taking an incoming call via the plurality of secondary devices by applying a rules database to the retrieved secondary device IDs to exclude secondary device IDs based on time of day and day of week; and
    transmit the list of qualified secondary device IDs to the Telephony Gateway.

2. The Authentication and Call Waiting Engine of claim 1, wherein execution of the programming by the processor configures the Authentication and Call Waiting Engine to perform further functions to:
    before receiving the request from the Telephony Gateway to retrieve the plurality of secondary devices, generate a secondary MDN to link the plurality of secondary devices to the primary MDN belonging to the primary device; and
    link the secondary MDN with the primary MDN in a secondary MDN database table.

3. The Authentication and Call Waiting Engine of claim 2, wherein execution of the programming by the processor configures the Authentication and Call Waiting Engine to perform further functions to:
    after linking the secondary MDN with the primary MDN in the secondary MDN database table, map each of the plurality of secondary devices to a unique secondary device ID; and
    link the unique secondary device ID to the primary MDN in the secondary device ID database table.

4. The Authentication and Call Waiting Engine of claim 3, wherein execution of the programming by the processor configures the Authentication and Call Waiting Engine to perform further functions to:
    before retrieving the secondary device ID for each of the plurality of secondary devices that are paired with the primary device, check the primary MDN against a subscriber database to ensure that a subscriber associated with the primary device is registered for a ringing service to secondary devices.

5. The Authentication and Call Waiting Engine of claim 4, wherein execution of the programming by the processor configures the Authentication and Call Waiting Engine to perform further functions to:
    in response to an outgoing call being placed on a first secondary device of the plurality of secondary devices, receive an authentication request from the Telephony Gateway to authenticate the first secondary device, the authentication request including a first secondary device ID;
    confirm that no limits are imposed on use of the first secondary device by applying the rules database to the first secondary device ID based on at least one of time of day, day of week, absolute location of the first secondary device, and relative location of the first secondary device to the primary device;
    retrieve the primary MDN of the primary device that is linked to the first secondary device ID by performing a reverse lookup in the secondary device ID database table with the first secondary device ID to find the primary MDN of the primary device;
    determine a subscriber identifier associated with the subscriber from the subscriber database by searching the subscriber database with the retrieved primary MDN; and
    transmit an acknowledgement back to the Telephony Gateway to confirm that that the secondary device satisfies the rules database and is permitted to place the outgoing call, the acknowledgment including the primary MDN and associated subscriber identifier to thereby provide caller ID information.

6. The Authentication and Call Waiting Engine of claim 4, wherein the secondary MDN generated by the Authentication and Call Waiting Engine is a non-routable ten digit number in a sub-200 range.

7. The Authentication and Call Waiting Engine of claim 6, wherein secondary device IDs generated by the Authentication and Call Waiting Engine for each of the plurality of secondary devices paired with the primary device share a fixed high set of digits corresponding to an IMEI of the primary device.

8. The Authentication and Call Waiting Engine of claim 7, wherein the secondary device IDs generated by the Authentication and Call Waiting Engine for each of the plurality of secondary devices paired with the primary device have a low set of digits that are randomly generated.

9. The Authentication and Call Waiting Engine of claim 5, wherein the request from the Telephony Gateway and the authentication request to the Authentication and Call Waiting Engine are Hypertext Transfer Protocol ("HTTP") or Extensible Markup Language ("XML") requests.

10. The Authentication and Call Waiting Engine of claim 5, wherein the plurality of secondary devices are non-telephony devices.

11. A method comprising:
sending a call alert to a primary device in response to receiving an incoming call from an originator device that is placed to a primary mobile directory number ("MDN") assigned to the primary device;
after sending the call alert to the primary device, looking up a secondary MDN that is linked to the primary MDN in a secondary MDN database table and then embedding the secondary MDN in an address;
routing the incoming call to a Telephony Gateway using the address;
in response to receiving the routed incoming call at the Telephony Gateway, generating and sending a request to an Authentication and Call Waiting Engine to retrieve identifiers of a plurality of secondary devices that are linked to the primary MDN of the primary device, wherein the plurality of secondary devices include a tablet computer or a laptop computer;
retrieving, at the Authentication and Call Waiting Engine, secondary device identifiers ("IDs") of the plurality of secondary devices that are paired with the primary device by searching a secondary device ID database table with the primary MDN to find all linked secondary device IDs;
generating a list of qualified secondary device IDs that do not violate usage rules imposed on taking the incoming call via the plurality of secondary devices by applying a rules database to the retrieved secondary device IDs to exclude secondary device IDs based on time of day and day of week; and
sending, from the Telephony Gateway, the call alert to qualified secondary devices linked to the qualified secondary device IDs.

12. The method of claim 11, further comprising:
before ringing the primary device in response to receiving the incoming call from the originator device, generating the secondary MDN to link the plurality of secondary devices to the primary MDN of the primary device; and
linking the secondary MDN with the primary MDN in the secondary MDN database table.

13. The method of claim 11, further comprising:
after linking the secondary MDN with the primary MDN in the secondary MDN database table, mapping each of the plurality of the secondary devices to a unique secondary device ID; and
linking the unique secondary device ID to the primary MDN in the secondary device ID database table.

14. The method of claim 13, further comprising:
after looking up the secondary MDN that is linked to the primary MDN in the secondary MDN database table, generating a Session Initiated Protocol Uniform Resource identifier ("SIP URI") address.

15. The method of claim 14, wherein the SIP URI address includes the secondary MDN embedded as a username.

16. The method of claim 15, wherein the SIP URI address further includes a domain or internet protocol ("IP") address of the Telephony Gateway embedded as a host.

17. The method of claim 13, further comprising:
before retrieving the secondary device IDs of the plurality of secondary devices that are paired with the primary device, checking the primary MDN against a subscriber database to ensure that a subscriber associated with the primary device is registered for a ringing service to secondary devices.

18. The method of claim 17, further comprising:
in response to an outgoing call being placed on a first secondary device of the plurality of secondary devices, receiving an authentication request from the Telephony Gateway to authenticate the first secondary device, the authentication request including a first secondary device ID;
confirming that no limits are imposed on use of the first secondary device by applying the rules database to the first secondary device ID based on at least one of time of day, day of week, absolute location of the first secondary device, and relative location of the first secondary device to the primary device;
retrieving the primary MDN of the primary device that is linked to the first secondary device ID by performing a reverse lookup in the secondary device ID database table with the first secondary device ID to find the primary MDN of the primary device;
determining a subscriber identifier associated with the subscriber from the subscriber database by searching the subscriber database with the retrieved primary MDN; and
transmitting an acknowledgement back to the Telephony Gateway to confirm that the secondary device satisfies the rules database and is permitted to place the outgoing call, the acknowledgment including the primary MDN and associated subscriber identifier to thereby provide caller ID information.

19. The method of claim 18, wherein the authentication request is a Hypertext Transfer Protocol ("HTTP") or Extensible Markup Language ("XML") request.

20. The method of claim 18, wherein the plurality of secondary devices are non-telephony devices.

* * * * *